(12) United States Patent
Lutz

(10) Patent No.: US 12,124,255 B2
(45) Date of Patent: Oct. 22, 2024

(54) CONTROL SYSTEM AND METHOD FOR REPRESENTING ALARM-DRIVEN TREND PROGRESSION DIAGRAMS DURING OPERATOR CONTROL AND MONITORING OF A TECHNICAL INSTALLATION

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/321,749

(22) Filed: May 17, 2021

(65) Prior Publication Data

US 2021/0364993 A1    Nov. 25, 2021

(30) Foreign Application Priority Data

May 20, 2020    (EP) .................................... 20175687

(51) Int. Cl.
  *G05B 23/02*    (2006.01)
  *G05B 9/02*    (2006.01)
  (Continued)

(52) U.S. Cl.
  CPC .............. *G05B 9/02* (2013.01); *G05B 15/02* (2013.01); *G05B 23/027* (2013.01); *G08B 3/10* (2013.01);
  (Continued)

(58) Field of Classification Search
  CPC .................... G05B 23/0291; G05B 23/0289
  (Continued)

(56) References Cited

U.S. PATENT DOCUMENTS

2007/0165031 A1* 7/2007 Gilbert .................... G06F 9/451
                                                               345/473
2009/0287339 A1   11/2009 Shimshi
(Continued)

FOREIGN PATENT DOCUMENTS

CN    103064359    4/2013
CN    106843168    6/2017
(Continued)

OTHER PUBLICATIONS

Mayes, "Linking PLC UDT Tags to HMI Faceplates and Pop-ups in TIA Portal V13 SP1" Dec. 30, 2015, accessed at https://www.dmcinfo.com/latest-thinking/blog/id/9136/linking-plc-udt-tags-to-hmi-faceplates-and-pop-ups-in-tia-portal-v13-sp1 (32 page print out) (Year: 2015).*

(Continued)

*Primary Examiner* — Emilio J Saavedra
(74) *Attorney, Agent, or Firm* — Cozen O'Connor

(57) ABSTRACT

A computer-implemented method for representing operator control information in the context of operator control and monitoring of a technical installation is proposed, which has at least one operator station server and one operator station client, wherein at least one measurement value of at least one technical object of the technical installation is received via the operator station server, a trend progression of the measurement value is generated in the event that an alarm, which relates to the measurement value, occurs in the operator station server, the trend progression from the operator station server is transferred to the operator station client, and the trend progression is visually presented to an operator of the technical installation in a trend progression diagram.

18 Claims, 3 Drawing Sheets

(51) Int. Cl.
  *G05B 15/02* (2006.01)
  *G08B 3/10* (2006.01)
(52) U.S. Cl.
  CPC .............. *G05B 2219/31437* (2013.01); *G05B 2219/32404* (2013.01)
(58) Field of Classification Search
  USPC .......................................................... 700/70
  See application file for complete search history.

(56) References Cited

U.S. PATENT DOCUMENTS

| | | | |
|---|---|---|---|
| 2013/0069792 A1* | 3/2013 | Blevins | G06F 17/16 |
| | | | 703/2 |
| 2013/0100136 A1* | 4/2013 | Van Camp | G05B 23/0267 |
| | | | 345/440 |
| 2013/0147630 A1* | 6/2013 | Nakaya | G08B 5/22 |
| | | | 340/691.6 |
| 2014/0245451 A1 | 8/2014 | Le Sant | |
| 2014/0277593 A1* | 9/2014 | Nixon | G06F 3/04817 |
| | | | 700/11 |
| 2014/0277619 A1 | 9/2014 | Nixon et al. | |
| 2014/0303754 A1* | 10/2014 | Nixon | G05B 23/0267 |
| | | | 700/83 |
| 2017/0254712 A1* | 9/2017 | Devereaux | G01L 19/08 |
| 2020/0327029 A1* | 10/2020 | Prakash | G06N 5/04 |

FOREIGN PATENT DOCUMENTS

| | | |
|---|---|---|
| DE | 102006019099 | 10/2007 |
| EP | 3076254 | 10/2016 |
| JP | 2004030113 A * | 1/2004 |
| JP | 2019008435 A * | 1/2019 |

OTHER PUBLICATIONS

EP Search Report dated Oct. 23, 2020 based on EP20175687 filed May 20, 2020.
Wang et al. "Mathematical Modelling Methods and Software Implementation", pp. 91-95, Sep. 30, 2018.

* cited by examiner

CONTROL SYSTEM AND METHOD FOR REPRESENTING ALARM-DRIVEN TREND PROGRESSION DIAGRAMS DURING OPERATOR CONTROL AND MONITORING OF A TECHNICAL INSTALLATION

BACKGROUND OF THE INVENTION

1. Field of the Invention

The invention relates to a control system for a technical installation and a computer-implemented method for representing operator control information in the context of operator control and monitoring of the technical installation, in particular manufacturing installation or process installation, which has at least one operator station server and one operator station client, where the operator station server is configured to generate at least one alarm that relates to a measurement value of a technical object of the technical installation which can be connected to the control system, and where the operator station server is configured to receive the measurement value from the technical object, generate a trend progression of the measurement value and transfer the trend progression to the operator station client to visually present the trend progression to an operator of the technical installation in a trend progression diagram.

2. Description of the Related Art

Immersive technologies, such as Virtual and Augmented Reality (VR, AR), or virtual environments, such as CAVE (Cave Automatic Virtual Environment), are becoming increasingly important in the industrial sector also. Immersive means that the virtual reality is largely perceived as real. In particular, the interactive visualization of machines in a virtual reality, in particular the user interface and the operator of the machines and the machine controls or the operating and monitoring devices used therein enable highly promising applications.

For purposes of operator control, monitoring and managing alarm of process-engineering installations, operators are provided with dynamized installation images and different graphical views to represent trend progressions or alarm sequences of process objects. Should alarms occur, the operators of a control system can perceive these in the different alarm views of the control system, e.g., in the message sequence displays of the installation images.

In order to analyze the cause of the alarm, the operator generally navigates manually to the installation image in which the block symbol of the process object issuing the alarm is contained to capture the process-engineering context and to open the faceplate of the process object for possible corrections. The process-engineering context can, for example, be a trend display in which the relevant process value which triggered the alarm, for example, is visualized as a curve.

The aim of the operator is therefore to evaluate the process value (process value trend) as efficiently as possible to understand the cause of the alarm and to derive the suitable corrections. However, the navigation in the control system as described earlier and established in accordance with the prior art results in the loss of valuable time, in particular if several alarms are triggered simultaneously and the operator also has yet to prioritize these for analysis and correction.

DE 10 2006 019 099 A1 discloses an apparatus for displaying process measurement values.

EP 3 076 254 A1 discloses a method for operation of a control system for a technical process in which process values are transferred for visualization to an operator station client embodied for this purpose.

SUMMARY OF THE INVENTION

It is an object of the invention to provide a computer-implemented method for representing operator control information, in the context of operator control and monitoring of a technical installation, which allows an efficient and targeted alarm management of the technical installation.

This and other objects and advantages are achieved in accordance with the invention by a computer-implemented method for representing operator control information in the context of operator control and monitoring of a technical installation. In this context, the technical installation has at least one operator station server and one operator station client. In accordance with the invention, the method comprises a) receiving at least one measurement value of at least one technical object of the technical installation by means of the operator station server; b) generating a trend progression of the measurement value in the event that an alarm which relates to the measurement value occurs in the operator station server; c) transferring the trend progression from the operator station server to the operator station client; and d) visually presenting trend progression to an operator of the technical installation in a trend progression diagram.

The technical installation can be an installation from the process industry, such as a chemical, pharmaceutical or petrochemical installation, or an installation from the food and beverage industry. This also encompasses any installations from the production industry, factories, in which, for example, automobiles or goods of all kinds are produced. Technical installations that are suitable for implementing the method in accordance with the invention can also come from the power generation sector. The term "technical installation" also encompasses wind turbines, solar installations or power generation plants.

These installations can have a control system or at least a computer-aided module for the open-loop and closed-loop control of the running process or production. In the present context, a control system is understood to mean a computer-aided technical system that comprises functionalities for representing, operating and controlling a technical system, such as a manufacturing or production installation. The control system can comprise what are known as process-oriented components that serve to activate the actuators or sensors. Furthermore, the control system can have inter alia devices for visualizing the process installation and for engineering. The term control system is additionally intended to also encompass further computing units for more complex closed-loop controls and systems for data storage and data processing.

In the present context, an "operator station server" is understood to mean a server that centrally captures data of an operator control and monitoring system and generally also alarm and measurement value archives of a control system of a technical installation, and makes this data available to users (known as operators). The operator station server generally establishes a communication connection to automation systems of the technical installation and forwards data of the technical installation to what is known as the operator station client, which data serves the purpose of operator control and monitoring of an operation of the individual functional elements of the technical installation.

The operator station server can be a SIMATIC PCS 7 industrial workstation server from SIEMENS, without being restricted to this.

The operator station client associated with the operator station server can have access to the data (archives, messages, tags, variables) of the operator station server and can visually represent images of an operation of the technical installation on a display device suitable for this purpose. The operator station client additionally possesses input means that serve the operator control of the technical installation by an operator. The term "operator control information" is intended to encompass, for example, visual representations of measurement values of the technical installation or selectable control instructions, which the operator can direct to the operator station server by means of the operator station client.

An operator is understood to mean a human user of the technical installation. The operator interacts with the technical installation or the control system thereof by means of specific user interfaces (for example, via the operator station client) and controls specific technical functions of the technical installation.

A technical object is understood to mean a self-contained technical unit that can be integrated into a higher-level control level. One such technical object may, for example, be an amalgamation of a plurality of measuring points or a larger installation part of an industrial installation. The technical object does not have to originate from the field of industrial installations, however, but rather may also be a motor module of an automotive, a ship or the like, for example.

In the present context, the term "alarm" is used synonymously with the term "alarm message", i.e., no distinction is made between the two terms. An alarm message in this context is a message that generally requires a prompt response by an operator of the technical installation. In this context, a message is understood to be a report about the occurrence of an event that represents a transition from one discrete state within the technical installation to another discrete state.

In a manner known per se, the operator station client receives measurement values from at least one technical object of the technical installation, such as a temperature sensor. The operator station client uses these measurement values to generate a trend progression and to visually present this to the operator via the operator station client for the purpose of operator control and monitoring. The trend progression comprises a progression of the measurement value over time. The trend progression can be an actual trend progression, i.e., the trend progression is based on measurement values that are in fact measured. The operator station server can generate the trend progression alternatively but also partially or completely via an interpolation of historical values of the measurement value. To this end, a mathematical method can be used, such as a polynomial interpolation for example.

It is essential that the trend progression for the measurement value is only generated if an alarm that relates to the measurement value occurs in the operator station server. In this way, the operator is efficiently informed only about the process values that immediately trigger an active alarm.

It is herein self-evident that the term "operator station server" does not have to refer to a single server, but rather also a plurality of servers can act as an "operator station server". For example, the alarm can be reported to a first server or generated there, whereas the generation of the trend progression then takes place on a second server.

The method is not restricted to the receipt of one single measurement value. On the contrary, a plurality of measurement values can be received. Various conditions (for example, in the context of an engineering of the technical installation) can be defined, with which measurement values an alarm relating to the measurement value leads to a generation of the associated trend progression. For example, all alarms that correspond to measurement values, the underlying technical objects of which are in a technical correlation or interact, can be defined as a trigger condition for a display of the associated trend progressions.

Particularly preferably, the trend progression is (only) generated, transferred to the operator station client, and provided there visually to the operator until the alarm is terminated. This allows on the one hand operator station server resources to be saved and on the other hand the operator can be efficiently and simply informed that the alarm that related to the trend progression previously displayed was resolved.

In an advantageous embodiment of the invention, in the event that the operator interacts with the trend progression diagram he/she is visually provided via the operator station client with a digital representation of the technical object on which the trend progression diagram is based. Therefore, for the purpose of an alarm handling, the respective faceplate of the technical object to which the visualized measurement value belongs can be opened by interaction with the displayed trend curve (for example, by a "click").

The generated trend progression is preferably stored in an archive of a control system of the technical installation. This has a particular importance when at least partially interpolated values of the measurement value were used to display the trend progression. An operator can make an operator control decision based on an interpolated measurement value. Consequently, the archiving of the trend progression supports later traceability.

It is also an object of the invention to provide a control system of a technical installation, in particular manufacturing installation or process installation, which has at least one operator station server and one operator station client, where the operator station server is configured to generate at least one alarm that relates to a measurement value of a technical object of the technical installation that can be connected to the control system, and where the operator station server is configured to receive the measurement value from the technical object, generate a trend progression of the measurement value and transfer the trend progression to the operator station client to visually present the trend progression to an operator of the technical installation in a trend progression diagram.

In accordance with the invention, the operator station server of the control system is configured to generate the trend progression of the measurement value and transfer it to the operator station client only if an alarm which relates to the measurement value occurs in the operator station server.

The operator station server is preferably configured to continue to generate the trend progression and transfer it to the operator station client for visual display to the operator until the alarm is terminated.

Particularly preferably the operator station client is configured such that, in the event that the operator interacts with the trend progression diagram, he/she is visually provided with a digital representation of the technical object on which the trend progression diagram is based.

In an advantageous embodiment of the control system, the operator station server is configured to generate the trend progression of the at least one measurement value partially or completely via an interpolation of historical values of the measurement value.

In a further advantageous embodiment of the control system, the operator station server is configured to store the trend progression of the at least one measurement value in an archive of the control system of the technical installation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now become clearer and more intelligible in conjunction with the following description of the exemplary embodiment, which will be explained in detail making reference to the drawings, in which.

DETAILED DESCRIPTION OF THE EXEMPLARY EMBODIMENTS

Figure 1:
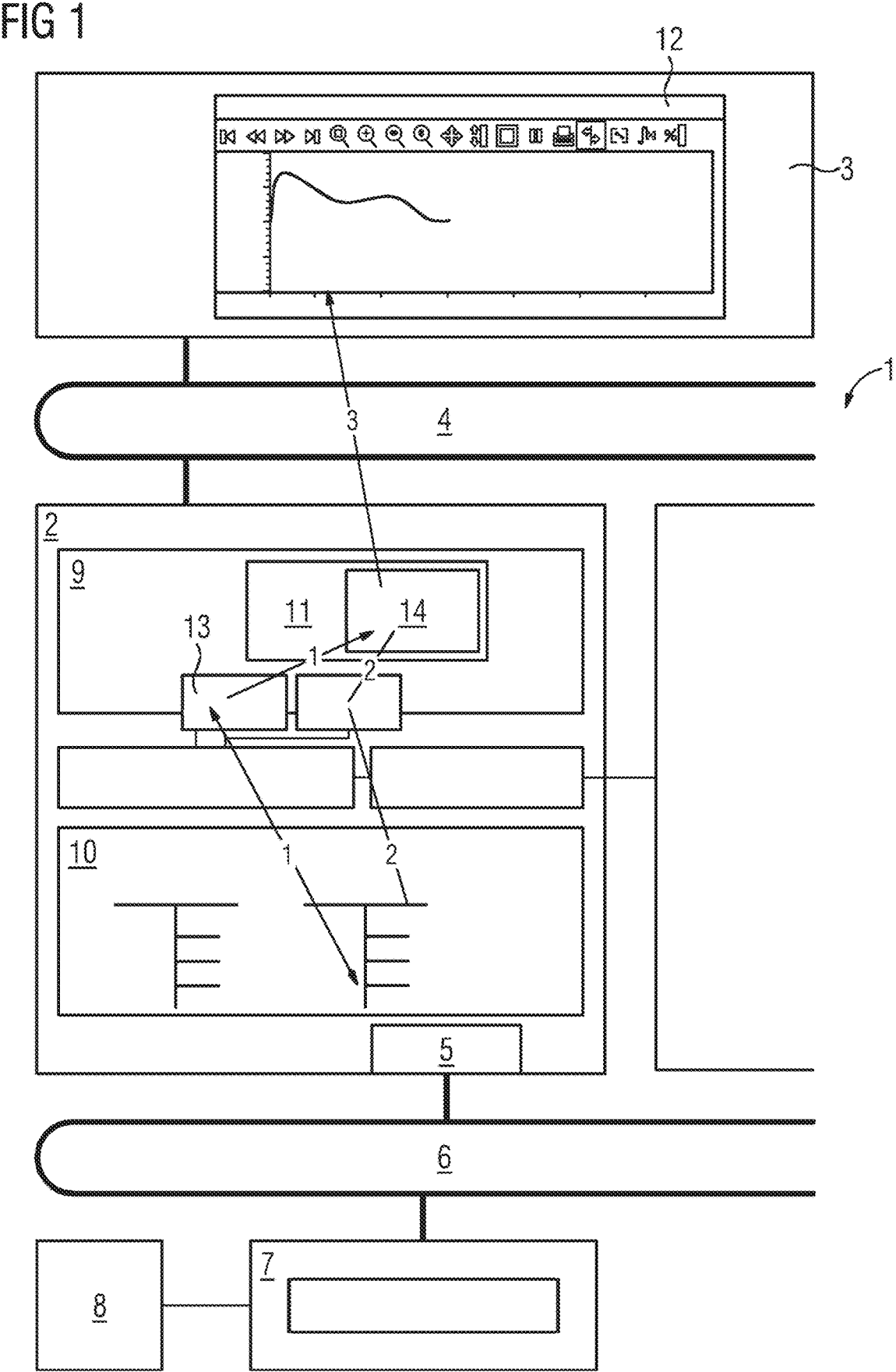
FIG. 1 shows an architecture of a control system of a technical installation in accordance with the invention.

FIG. 1 shows a part of a control system 1 of a process installation in accordance with the invention. The control system 1 comprises a server of an operator control system or an operator station server 2 and an operator station client 3 associated therewith. The operator station server 2 and the operator station client 3 are interconnected via a terminal bus 4 and are connected to further components (not shown) of the control system 1, such as an engineering system server or a process data archive.

A user or operator has access to the operator station server 2 via the operator station client 3 over the terminal bus 4, in the context of operator control and monitoring. The terminal bus 4 can be formed, without being limited thereto, as an industrial Ethernet, for instance.

The operator station server 2 has a device interface 5 that is connected to an installation bus 6. This can be used by the operator system server 2 to communicate with an automation device 7 of the control system 1. The installation bus 6 can be formed, without being limited thereto, as an industrial Ethernet, for instance. The automation device 7 has a connection to a technical object 8.

Integrated in the operator station server 2 is a visualization service 9, via which a transmission of (visualization) data to the operator station client 3 can occur. Additionally, the operator station server 2 has a process image 10 of the process installation.

In normal operating mode, the operator station server 2 receives measurement values from the technical object 8 via the automation device 7. The measurement values are stored in the process image 10 of the operator station server 2. A trend service 11, which represents a part of the visualization service 9, reads the measurement values from the process image 10, generates a trend progression therefrom and transmits the trend progression to the operator station client 3, which presents the trend progression in the form of a trend progression diagram 12 to an operator of the technical installation.

For example, if a measurement value exceeds a particular threshold value, then an alarm message or an alarm is stored in the process image 10 of the operator station server 2. An alarm service 13 of the operator station server 2 detects the triggering of the alarm and reports this information to a subservice 14 of the trend service 11 (step "1"). The subservice 14 reads the information from the process image 10 as to which measurement value belongs to the generated alarm or the generated alarm message (step "2"). This information was previously stored in an engineering phase of the process installation in the process image 10. The subservice then reads this measurement value continuously from the process image 10. In this way, the subservice 14 can also extract from the process image 10 further information that is necessary for the visual representation of the trend progression diagram 12 of the measurement value or that represents a reasonable enhancement, such as the physical unit (° C., bar . . . ), scalings, or preferred colors.

Where applicable, the subservice 14 can have additional information (from where has it obtained the information or from where is it read?), which shows that in addition to the measurement value belonging to the actual alarm further measurement values, in particular measurement values linked to the measurement values in process engineering terms or actively connected measurement values, are to be read out from the process image 10. The visualization of trend curves in this context is limited to the time frame for which a respective alarm is also relevant. If the alarm is terminated or resolved, then the representation of the measurement value in the trend progression diagram 12 is terminated. If the operator wants to analyze directly the technical object 8 associated with the respective trend progression diagram, then this can be triggered by a suitable interaction with the trend curve diagram (for example by "clicking" the trend progression). This opens the respective, so-called faceplate of the technical object, i.e., the digital representation thereof, with which the operator can interact in a conventional manner.

Figure 2:
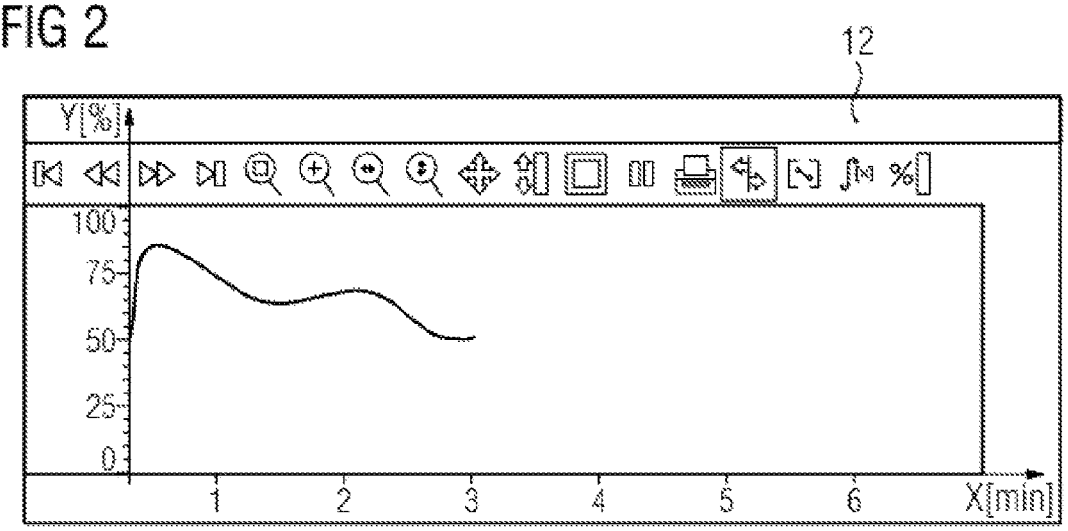
FIG. 2 shows a trend progression of a measurement value in accordance with a first embodiment.

FIG. 2 shows an exemplary trend progression diagram 12 of an arbitrary measurement value of a technical installation configured as a process installation. The trend progression diagram 12 comprises a temporal progression of the measurement value (time in minutes in the X direction, to a maximum value of 100% normalized value in the Y direction). The trend progression diagram 12 shows the current progression of the measurement value. The representation of the trend progression diagram 12 was triggered in the present example as the measurement value exceeded a threshold value of 50% of the maximum value. At this point in time, a corresponding alarm was triggered in the control system 1 of the process installation and the visual representation of the trend progression diagram 12 was initiated. After 3 minutes, the alarm was terminated such that, from this point onward, no trend progression of the measurement value is generated and the trend progression is accordingly no longer displayed in the trend progression diagram 12.

Figure 3:
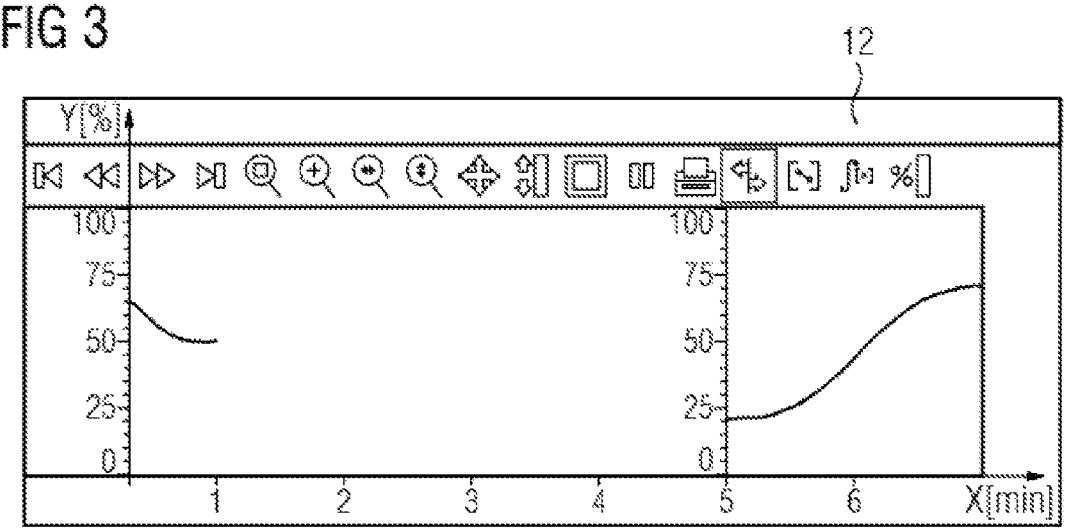
FIG. 3 shows a trend progression of a measurement value in accordance with a second embodiment.

FIG. 3 shows a further exemplary trend progression diagram 12. The trend progression diagram 12 shows the current progression of the measurement value. A previous trend progression of the measurement value can be seen on the left side of the trend progression diagram 12, the representation of which was terminated as a result of a termination of the associated alarm (the curve "stops"). A new representation of the trend progression of the measurement value was triggered on the right side of the trend progression diagram 12, in which the measurement value exceeded a threshold value of 25% of the maximum value. It is therefore possible to represent trend progressions of measurement values that were caused by different alarms in a common trend progression diagram 12. It therefore does not necessarily have to be the same measurement value of a technical object. Rather, the measurement values can explicitly be assigned to different technical objects.

Figure 4:
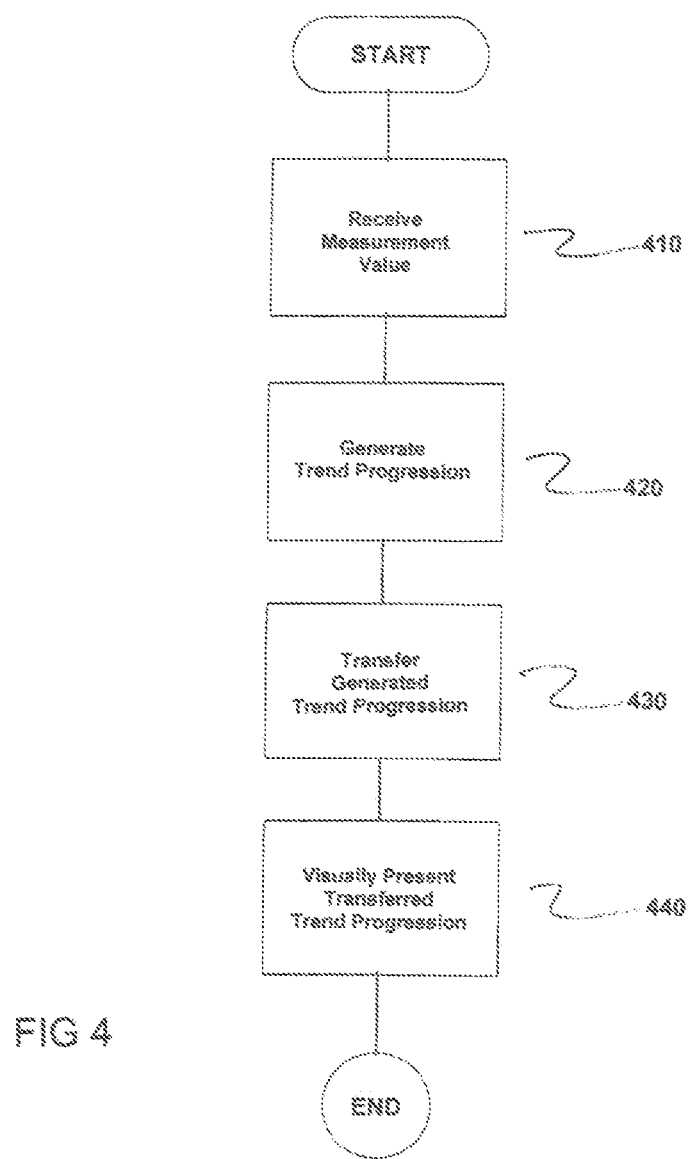
FIG. 4 is a flowchart of the method in accordance with the invention.

FIG. 4 is a flowchart of the computer-implemented method for representing operator control information in the context of operator control and monitoring of a technical installation having at least one operator station server (2) and one operator station client 3. The method comprises receiving at least one measurement value of at least one technical object 8 of the technical installation via the at least one operator station server 2, as indicated in step 410.

Next, a trend progression of the measurement value is generated in the event of an alarm that relates to the measurement value occurring in the at least one operator station server 2, as indicated in step 420.

Next, the generated trend progression is transferred from the at least one operator station server 2 to the operator station client 3, as indicated in step 430.

Next, the transferred trend progression is visually presented to an operator of the technical installation in a trend progression diagram 12, as indicated in step 440.

Although the invention has been illustrated and described in greater detail with the preferred exemplary embodiment and the figures, the invention is not restricted by the examples disclosed and other variations can be derived therefrom by the person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computer-implemented method for representing operator control information within a context of operator control and monitoring of a technical installation having at least one operator station server and one operator station client, the method comprising:
    a) receiving at least one measurement value of at least one technical object of the technical installation via the at least one operator station server, a visualization service and an alarm service being integrated into said at least one operator station server, and a subservice being integrated into a trend service which forms part of the visualization service;
    b) generating a trend progression of the measurement value in an event of an alarm which relates to the measurement value occurring in the at least one operator station server, the alarm service detecting triggering of the alarm and reporting said triggering to the subservice of the trend service;
    c) transferring the generated trend progression from the at least one operator station server to the operator station client; and
    d) visually presenting the transferred trend progression to an operator of the technical installation in a trend progression diagram to permit analysis of the technical object by interacting with the trend progression diagram to open a faceplate of the technical object, the trend progression diagram including a current progression of the measurement value and including a previous trend progression of a measured value provided as a result of a termination of an associated alarm.

2. The computer-implemented method as claimed in claim 1, wherein the trend progression is generated, transferred to the operator station client and visually provided at the operator station to the operator until the alarm is terminated.

3. The computer-implemented method as claimed in claim 1, wherein in an event of the operator interacting with the trend progression diagram said operator is visually provided via the operator station client with a digital representation of the technical object upon which the trend progression diagram is based.

4. The computer-implemented method as claimed in claim 2, wherein in an event of the operator interacting with the trend progression diagram said operator is visually provided via the operator station client with a digital representation of the technical object upon which the trend progression diagram is based.

5. The computer-implemented method as claimed in claim 1, wherein the trend progression of the measurement value is stored in an archive of a control system of the technical installation.

6. The computer-implemented method as claimed in claim 1, wherein the trend progression of the measurement value is generated partially or completely via an interpolation of historical values of the measurement value.

7. A control system for a technical installation having at least one operator station server and one operator station client, the at least one operator station server being configured to generate at least one alarm which relates to a measurement value of a technical object of the technical installation which is connectable to the control system, and the at least one operator station server being configured to receive the measurement value from the technical object to generate a trend progression of the measurement value and to transfer the trend progression to the operator station client to present the trend progression to an operator of the technical installation visually in a trend progression diagram to permit analysis of the technical object by interacting with the trend progression diagram to open a faceplate of the technical object, a visualization service and an alarm service being integrated into said at least one operator station server, and a subservice being integrated into a trend service which forms part of the visualization service;
    wherein the at least one operator station server is further configured to generate the trend progression of the measurement value and transfer said generated trend progression to the operator station client only if an alarm which relates to the measurement value occurs in the at least one operator station server, the alarm service detecting triggering of the alarm and reporting said triggering to the subservice of the trend service; and wherein the trend progression diagram includes a current progression of the measurement value and includes a previous trend progression of a measured value provided as a result of a termination of an associated alarm.

8. The control system as claimed in claim 7, wherein the at least one operator station server is further configured to continue generating the trend progression and transfer said generated trend progression to the operator station client for visual display to the operator until the alarm is terminated.

9. The control system as claimed in claim 7, wherein the operator station client is further configured such that in the event that the operator interacts with the trend progression diagram said operator is visually provided with a digital representation of the technical object upon which the trend progression diagram is based.

10. The control system as claimed in claim 8, wherein the operator station client is further configured such that in the event that the operator interacts with the trend progression diagram said operator is visually provided with a digital representation of the technical object upon which the trend progression diagram is based.

11. The control system as claimed in claim 7, wherein the at least one operator station server is further configured to generate the trend progression of the at least one measurement value partially or completely via an interpolation of historical values of the measurement value.

12. The control system as claimed in claim 8, wherein the at least one operator station server is further configured to generate the trend progression of the at least one measurement value partially or completely via an interpolation of historical values of the measurement value.

13. The control system as claimed in claim 8, wherein the at least one operator station server is further configured to store the trend progression of the at least one measurement value in an archive of the control system of the technical installation.

14. The control system as claimed in claim 9, wherein the at least one operator station server is further configured to store the trend progression of the at least one measurement value in an archive of the control system of the technical installation.

15. The control system as claimed in claim 11, wherein the at least one operator station server is further configured to store the trend progression of the at least one measurement value in an archive of the control system of the technical installation.

16. The control system as claimed in claim 7, wherein the technical installation comprises a manufacturing installation or process installation.

17. The control system as claimed in claim 9, wherein the at least one operator station server is further configured to generate the trend progression of the at least one measurement value partially or completely via an interpolation of historical values of the measurement value.

18. The control system as claimed in claim 7, wherein the at least one operator station server is further configured to store the trend progression of the at least one measurement value in an archive of the control system of the technical installation.

\* \* \* \* \*